(12) United States Patent
Harris et al.

(10) Patent No.: US 9,395,042 B2
(45) Date of Patent: Jul. 19, 2016

(54) PANEL MOUNTING SYSTEM

(71) Applicants: Bryan K. Harris, Sandy, UT (US);
Brian Hillstrom, Loretto, MN (US);
Guillaume Martin, Rochetoirin (FR);
Michael Damen, Rochetoirin (FR)

(72) Inventors: Bryan K. Harris, Sandy, UT (US);
Brian Hillstrom, Loretto, MN (US);
Guillaume Martin, Rochetoirin (FR);
Michael Damen, Rochetoirin (FR)

(73) Assignee: 3Form, LLC, Salt Lake City, UT (US)

( * ) Notice: Subject to any disclaimer, the term of this patent is extended or adjusted under 35 U.S.C. 154(b) by 0 days.

(21) Appl. No.: 14/170,433

(22) Filed: Jan. 31, 2014

(65) Prior Publication Data

US 2014/0145043 A1    May 29, 2014

Related U.S. Application Data

(60) Division of application No. 13/353,146, filed on Jan. 18, 2012, and a continuation-in-part of application No. 12/028,584, filed on Feb. 8, 2008, now Pat. No. 8,167,152.

(60) Provisional application No. 61/434,934, filed on Jan. 21, 2011, provisional application No. 60/888,821, filed on Feb. 8, 2007.

(51) Int. Cl.
*F16M 13/02* (2006.01)
*A47B 96/14* (2006.01)
*A47F 5/10* (2006.01)
*H02G 3/04* (2006.01)

(52) U.S. Cl.
CPC .......... *F16M 13/022* (2013.01); *A47B 96/1466* (2013.01); *A47F 5/105* (2013.01); *H02G 3/0437* (2013.01)

(58) Field of Classification Search
CPC ..... E04B 2/766; E04B 2/7425; E04B 2/7433; E04B 2/78; E04B 2/7809; E04B 2/7818; E04B 2/7845; E04B 2/7854; E04B 2/7863; E04B 2/7872; E04B 2/7881; E04B 2/789; A47B 96/1425; A47B 96/1466; A47B 96/1475; A47B 96/1483; A47B 2096/1491; A47B 57/26; F16B 12/02; F16M 13/022; A47F 5/105; H02G 3/0437
USPC .............. 211/192, 196, 187, 189, 86.01, 175, 211/182, 204, 206; 52/239, 241; 160/135, 160/351; 403/254, 261, 257–259; 248/220.21, 235, 121, 295.11
See application file for complete search history.

(56) References Cited

U.S. PATENT DOCUMENTS

| | | | |
|---|---|---|---|
| 3,080,980 A | | 3/1963 | Gibbons |
| 3,261,625 A | | 7/1966 | Cripe |
| 3,370,389 A | * | 2/1968 | Macaluso ........................ 52/239 |
| 3,451,183 A | * | 6/1969 | Lespagnol .............. E04B 2/766 403/230 |
| 3,513,606 A | * | 5/1970 | Jones ................................. 52/27 |
| 3,566,561 A | * | 3/1971 | Tozer .......................... 52/127.12 |
| 3,834,092 A | * | 9/1974 | Whisson ........................ 52/36.4 |
| 4,035,972 A | * | 7/1977 | Timmons ........................ 52/241 |
| 4,458,461 A | * | 7/1984 | Holley .................. E04B 2/7818 52/239 |

(Continued)

*Primary Examiner* — Patrick Hawn
(74) *Attorney, Agent, or Firm* — Workman Nydegger (57) ABSTRACT

In general, implementations of the present invention include devices, systems, and components for mounting and/or displaying panels and panel structures with one or more post modules. The post modules, according to the present invention, can include a post, which can secure one or more panels, and covers that can conceal the post from view. Additionally, the post modules can have hollow channels between the covers and the post, which can house wires, cords, lighting elements, and other components.

19 Claims, 5 Drawing Sheets

(56) References Cited

U.S. PATENT DOCUMENTS

| | | | |
|---|---|---|---|
| 4,470,647 A | 9/1984 | Bishoff | |
| 4,560,130 A | 12/1985 | Schwartz | |
| 4,585,131 A * | 4/1986 | Crossman et al. | 211/206 |
| 4,652,170 A | 3/1987 | Lew | |
| 5,067,294 A | 11/1991 | McGowan | |
| 5,069,263 A | 12/1991 | Edwards | |
| 5,429,438 A * | 7/1995 | Wood | 384/42 |
| 5,491,943 A | 2/1996 | Vondrejs | |
| 5,634,300 A * | 6/1997 | Huebner | E04B 2/7407 52/281 |
| 5,797,514 A | 8/1998 | Twiggar | |
| 5,864,997 A | 2/1999 | Kelly | |
| 5,881,528 A * | 3/1999 | Grewe | E04F 19/00 52/831 |
| 6,009,683 A * | 1/2000 | Grewe | E04C 3/30 52/301 |
| 6,055,912 A | 5/2000 | Doud | |
| 6,311,441 B1 * | 11/2001 | Beavers et al. | 52/239 |
| 6,592,194 B2 * | 7/2003 | Lininger et al. | 312/257.1 |
| 6,754,998 B2 * | 6/2004 | Diffrient et al. | 52/239 |
| 6,837,389 B2 * | 1/2005 | Gassler | 211/189 |
| 7,165,690 B2 | 1/2007 | Wu | |
| 7,293,667 B2 * | 11/2007 | Flynn | 211/189 |
| 2003/0089674 A1 * | 5/2003 | Gassler | 211/189 |
| 2003/0155318 A1 * | 8/2003 | Jacobs et al. | 211/189 |
| 2004/0184276 A1 * | 9/2004 | Moll | 362/487 |
| 2005/0205509 A1 | 9/2005 | Flynn | |
| 2008/0180962 A1 * | 7/2008 | Edmond et al. | 362/473 |
| 2011/0064539 A1 * | 3/2011 | Ghatikar et al. | 411/371.2 |
| 2013/0016500 A1 * | 1/2013 | Tress | 362/133 |

* cited by examiner

PANEL MOUNTING SYSTEM

CROSS-REFERENCE TO RELATED APPLICATIONS

The present application is a divisional of U.S. patent application Ser. No. 13/353,146, filed Jan. 18, 2012, entitled "Panel Mounting System," which claims the benefit or priority to U.S. Provisional Patent Application No. 61/434,934, filed Jan. 21, 2011, entitled "Panel Mounting System," which is also a continuation-in-part application of U.S. patent application Ser. No. 12/028,584, filed Feb. 28, 2008, entitled "Variable Height and Angle Panel Mounting Systems, Methods, and Apparatus," which claims priority to U.S. Provisional Patent Applications No. 60/888,821, filed Feb. 8, 2007, entitled "Modular Panel Mounting Systems and Apparatus." The entire content of each of the foregoing patent applications is incorporated by reference herein.

BACKGROUND OF THE INVENTION

1. The Field of the Invention

This invention relates to systems, methods, and apparatus for mounting and/or displaying panels as doors, partitions, barriers, displays, shelving, tables, and other structures.

2. Background and Relevant Art

Some recent architectural designs have implemented synthetic, polymeric resins, which may be used as partitions, displays, barriers, treatments, etc. In general, resin materials are now popular compared with decorative cast or laminated glass materials, since resin materials may be manufactured to be more resilient and to have a similar transparent, translucent, or colored appearance as cast or laminated glass, but with less cost. Decorative resins may also provide more flexibility compared with glass at least in terms of color, degree of texture, gauge, and impact resistance. Furthermore, decorative resins have a fairly wide utility since they may be formed to include a large variety of artistic colors, images, and shapes.

Designers and builders frequently use posts modules to mount or display various panels, including thermoplastic resin panels, in desired configurations. For example, an installer can use post modules to secure the panels in an upright position to form a partitioning system. Similarly, an installer can make shelving units by securing the desired panels horizontally to the post modules. A user or an onlooker, however, can easily see the conventional post modules in the system, which can lessen the aesthetic appeal of the system. Hence, designers and builder may desire to reduce the visibility of conventional post modules or portions thereof. Many conventional post modules do not allow for concealing or masking the post in a way that reduces the visibility or prominence of the post and/or enhances the aesthetic appeal of the entire panel system.

In addition, post modules of conventional mounting systems typically do not provide additional functionality other than securing a panel or panels in a desired configuration. Thus, designers are often limited aesthetically and functionally when using conventional post modules. Accordingly, there are a number of disadvantages in conventional panel mounting systems that can be addressed.

BRIEF SUMMARY OF THE INVENTION

Implementations of the present invention provide systems, methods, and apparatus for mounting panels with a great deal of functional and aesthetic versatility. In particular, one or more implementations include post modules that allow the designer or installer to integrate decorative and/or functional elements into the post module assemblies. For instance, the post module assemblies can incorporate covers or other decorative elements that either conceal the post modules or otherwise add to the aesthetic appeal of the panel system. Furthermore, the post module assemblies also can incorporate various functional components that can provide additional utility to a user.

At least one implementation includes a post that secures panels to form one or more of doors, partitions, barriers, displays, shelving, tables, and other structures. In such implementations, the post has a first support member with a first end and a second end, and a second support member with a first end and a second end. The first support member connects to the second support member such that and angle between the first and second support members is approximately 90 degrees or less. Furthermore, the post includes a first mounting channel positioned on the first end of the first support member. Similarly, the post also has a second mounting channel positioned on the first end of the second support member. The first and second mounting channels are sized and configured to receive one or more mounting members.

One or more implementations also include a post module assembly for securing panels to form one or more of doors, partitions, barriers, displays, shelving, tables, and other structures. In such implementations, the post module assembly has a post with a plurality of mounting channels and one or more covers. The plurality of mounting channels are sized and configured to receive one or more mounting members. The one or more covers are sized and configured to be removably coupled to the post and to span between at least two mounting channels of the plurality of mounting channels. The covers conceal at least a portion of the post between at least two mounting channels of the plurality of the mounting channels.

At least one implementation includes a system of mounted panels configured as one or more of doors, partitions, barriers, displays, shelving, tables, and other structures. Such system has one or more post module assemblies, and each of the post module assemblies includes a post with a plurality of mounting channels, and a plurality of covers secured to the post. Such system also includes mounting channels that are sized and configured to receive one or more mounting members. Additionally, the system has covers that span between at least two mounting channels of the plurality of mounting channels. To secure the system, one or more base assemblies secure the post module assemblies to one or more support surfaces. The system also includes one or more mounting members secured within one or more mounting channels of the plurality of mounting channels, and one or more panels secured to the one or more post modules by the one or more mounting members.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention provide systems, methods, and apparatus for mounting panels with a great deal of functional and aesthetic versatility. In particular, one or more implementations include post modules that allow the designer or installer to integrate decorative and/or functional elements into the post module assemblies. For instance, the post module assemblies can incorporate covers or other decorative elements that either conceal the post modules or otherwise add to the aesthetic appeal of the panel system. Furthermore, the post module assemblies also can incorporate various functional components that can provide additional utility to a user.

In at least one implementation, the post module assembly can include a post, which can secure one or more panels thereto. The post can accommodate various mounting members for securing panels. For example, the post can have a configuration that can allow the installer to secure the panels at various angles with respect to one another. In at least one instance, the installer can secure two or more panels in substantially orthogonal planes to create a corner structure. The installer also can use one or more post module assemblies to secure panels and to form panel systems that can provide variety of useful and/or decorative structures.

In addition to providing a secure, yet easily configurable, mount of one or more panels to a structure, one or more implementations can help magnify the aesthetic features of a mounted panel. For example, one or more implementations can provide mounting systems that reduce or eliminate the visibility of hardware. Accordingly, a user can easily adapt implementations of the present invention to an environment of use and provide a number of secure mounting options.

In particular, the post module assemblies can include one or more decorative or functional covers. For example, the installer can conceal at least a portion of the post by attaching one or more covers to the post. Thus, the post also can have a configuration that allows the installer to selectively conceal or obscure hardware, thereby, increasing the aesthetic appeal of the system. Furthermore, in one or more implementations, the post module assemblies can include removable and/or replaceable covers, such that the builder or a user can remove and/or replace the covers as desired to change or modify a panel system.

The covers can camouflage, conceal, or reduce prominence of the post module assemblies within a panel system. For instance, the covers can comprise the same color, design, and/or material as the panels secured by the particular post module assembly. By concealing, camouflaging, or minimizing prominence of the post module assemblies, the builder can minimize the detraction from the overall aesthetic of the panel system created by the hardware. Thus, the covers can create an enhanced overall appeal to a viewer, as the viewer's attention can focus on the attractive features of the panels in such system.

Additionally or alternatively, the post module assemblies also can increase the functionality of the panel system. For example, the post module assemblies can accommodate electrical and data wires and cables, or other functional equipment. Also, in addition to enhancing the overall aesthetic appeal of the panel system and the surrounding area, concealing the wires can improve the overall safety of the surrounding area by reducing potential tripping and entanglement hazards. Furthermore, in at least one implementation, the post module assemblies can incorporate one or more lighting elements.

As mentioned above, a user (architect, designer, assembler, etc.) may choose to use components of the present invention to mount resin panels because they can allow resin panels to be quickly and easily mounted with a reduced likelihood of damage, while also providing a pleasing aesthetic. As used herein, the terms "resin panel" and "resin-based panel" refer to panels comprising a substrate of one or more layers or sheets formed from any one of the following thermoplastic polymers (or alloys thereof). Specifically, such materials can include, but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like.

As a preliminary matter, implementations of the present invention are described herein primarily with reference to mounting panels, such as resin panels. One will appreciate, however, that a panel, particularly a resin-based panel, is only one type of "structure" which a user may mount using the components, systems, and methods described herein can be used. For example, a user can use implementations of the present invention to mount not only resin "panels," as such, but also glass panels, to a given support structure. Furthermore, one will appreciate that a user can use various components and mounting assemblies described herein to mount other types of structures having different material compositions, such as objects comprising wood, stone, fiberglass, or the like, which may or may not exhibit primarily panel-like dimensions as described herein. Reference herein, therefore, to panels, or even resin panels, as such, is primarily for convenience in description.

Figure 1:
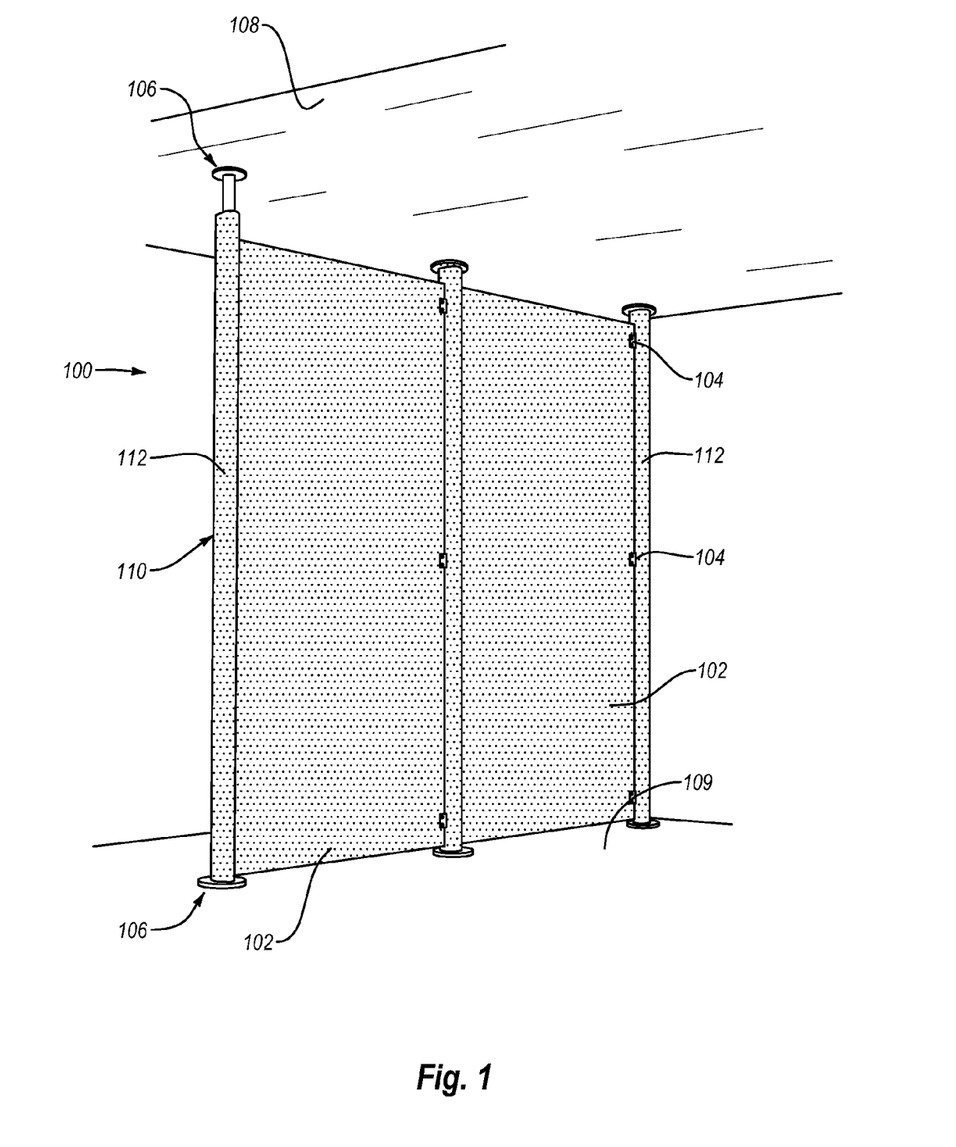
FIG. 1 illustrates a perspective view of a panel system with multiple post module assemblies in accordance with one implementation of the present invention.

For example, FIG. 1 illustrates a schematic of a panel mounting system 100 that includes a plurality of panels 102 mounted in accordance with one or more implementations of the present invention. In particular, the panel system 100 can include a plurality of post module assemblies 110. As described in greater detail below, the post module assemblies 110 can include a post having mounting channels. The mounting channels can receive and support mounting members 104. The mounting members 104 can in turn couple the panels 102 to the post module assemblies 110.

FIG. 1 further illustrates that base assemblies 106 can secure the post module assemblies 110 to a support surface(s). In particular, FIG. 1 illustrates an upper base assembly 106 can secure an upper end of the post module assembly 110 to a ceiling 108, and a lower base assembly 106 can secure a lower end of the post module assembly 110 to a floor surface 109.

FIG. 1 illustrates vertically oriented post module assemblies 110 that form a partition structure. One will appreciate in light of the disclosure herein that the present invention is not so limited. Indeed, an installer can modify the orientation and configuration of the post module assemblies 110 to form any number of different configurations including shelving, cubicles, partial partitions, free standing walls, etc. For example, an installer can assembly the post module assemblies 110 in any of the configuration shown in U.S. Provisional Patent Application Nos. 61/434,934 and 60/888,821, which were previously incorporated by reference herein.

Additionally, FIG. 1 illustrates that one or more implementations can securely mount a panel 102 to a support structure 108, 109, while at least partially concealing some or all hardware components. For example, FIG. 1 illustrates that the post module assemblies 110 can include covers 112 that conceal at least portions of the hardware (i.e., posts). For example, FIG. 1 illustrates a plurality of thermoplastic resin covers 112 that are configured to match one or more of a color, texture, and design of at least one of the one or more thermoplastic resin panels 102.

Figure 2:
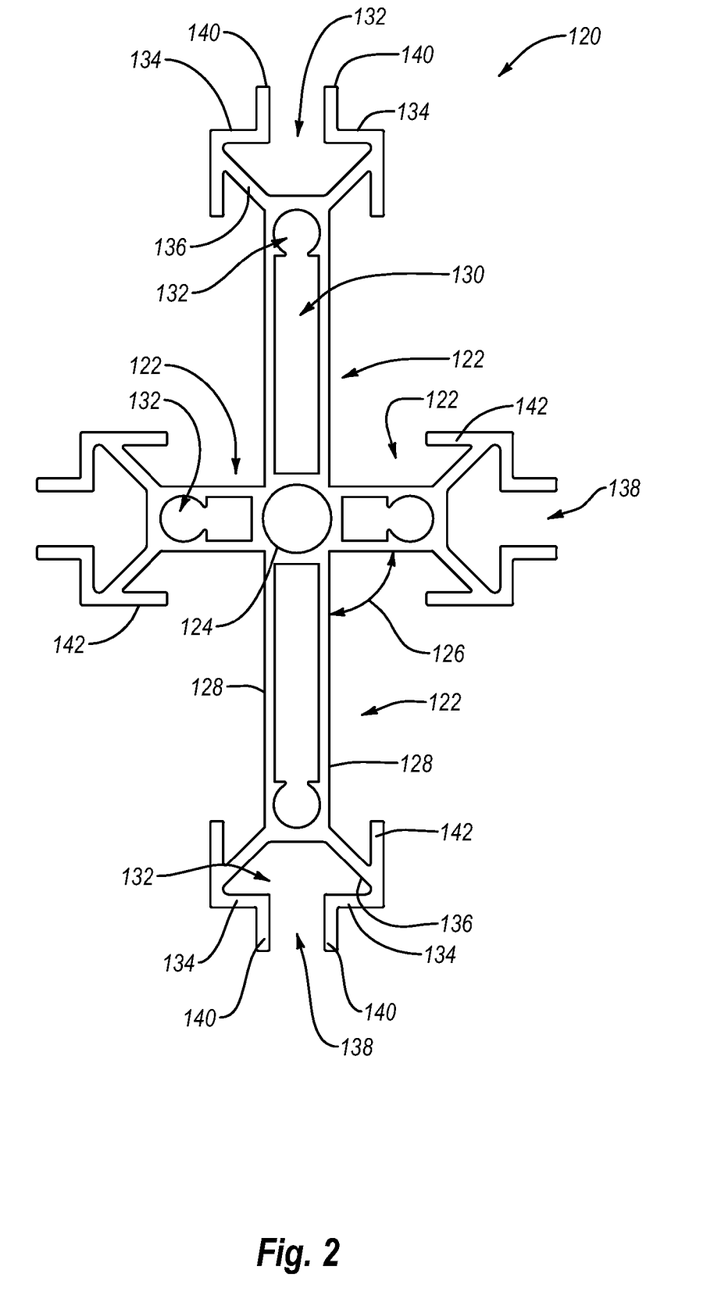
FIG. 2 illustrates a top view of a post of a post module assembly in accordance with one implementation of the present invention.

Referring now to FIG. 2, a top view of a post 120 (also sometimes referred to as a frame) in accordance with an implementation of the present invention is illustrated. The post 120 can form part of a post module assembly 110 as shown in FIG. 1. In particular, the post 120 can comprise the structural support component of a post module assembly to which mounting members 104 and covers 112 (FIG. 1) are mounted.

The post 120 can comprise an extruded aluminum or other metal. By way of explanation, one will appreciate that the components illustrated or otherwise described herein can comprise any number of different materials, including any number or type of sufficiently rigid synthetic or naturally occurring metals, rubber or plastic materials, and/or combinations thereof. In particular, virtually any materials of appropriate strength can be used to form or otherwise prepare the components of the panel mounting system 100, depending on the functional and/or aesthetic needs of the assembler or manufacturer. For example, in some cases, the materials are chosen not only for strength and rigidity, but also for various aesthetic concerns, including polish, degree of translucence, or ability to match coloration with a given panel, etc.

As illustrated by FIG. 2, in one or more implementations, the post 120 can have a cross- or a plus-shaped cross-section. Such implementations can include a plurality of support members 122 that intersect and/or interconnect one with another to form such a cross-shaped cross-section of the post 120. For example, the post 120 can have four interconnected support members 122. Each of the support members 122 can have a first end and a second end, and the second ends of each of the support members 122 can join at a center point of the post 124.

In alternative implementations, the post 120 can have more or fewer than four support members 122. For example, the post 120 can include two, three, five, or six support members. In such implementations, the post 120 can include a T, Y, X, L, or other cross-sectional shape.

In any event, the interconnected support members 122 can form various angles 126 with respect to each other. In particular, an angle 126 of approximately 90° or less can separate adjacent support members 122. For example, FIG. 2 illustrates that adjacent support members 122 are separated by an angle of 90°. In alternative implementations, an angle 126 of approximately 45° can separate adjacent support members 122. Additionally or alternatively, the post 120 can have support members 122 that form angles 126 between 90° and 180°. In light of this disclosure, those skilled in the art should appreciate that the support members 122 can form other angles 126 between 0° and 180°.

Furthermore, FIG. 2 illustrates that all of the angles 126 between support members 122 can be equal (i.e., 90°). In alternative implementations, the angles 126 between adjacent support members 122 can vary. For example, a post with a shape can have two 90° angles and a 180° angle. Alternatively, a post with a Y-shape can include two 135° angles and a 90° angle.

The support members 122 of the post 120 can have one or more walls 128 that form and/or define the support members 122. In or more implementations, the walls 128 can have a substantially flat surface and/or substantially rectangular (or rectangular prismoid) shape. Furthermore, the walls 128 also can form one or more hollow interiors 130 to reduce the weight of the post 120.

The post 120 also can include one or more fastening channels 132. Generally, fastening channels 132 can have a cylindrical shape, such that can allow the installer to thread one or more fasteners into the fastening channels 132. Additionally, the fastening channels 132 can extend through an entire length along a longitudinal axis of the post 120 or can terminate at a desired distance from the upper and lower ends of the post 120. As explained in greater detail below, the fastening channels 132 can allow an installer to secure the post 120 to a base assembly 106 (FIG. 1) or support structure.

As described above, various mounting members can attach to the post 120. In at least one implementation, the post 120 can incorporate one or more mounting channels 132, which can accept and secure mounting members 104 (FIG. 1). The mounting channels 132 can have a size and configuration that allows the installer to attach, couple, and secure mounting members to or within the mounting channels 132. For example, the mounting channels 132 can have t-slot configurations, which can accept various mounting members, such as t-slot nuts, regular nuts, heads of screws and bolts, and custom hardware.

The mounting channels 132 can have various configurations. For example, FIG. 2 illustrates that the mounting channels 132 can include a trapezoidal shape. In particular, two front walls 134 and a back wall 136 can define the trapezoidal shape of the mounting channels 132. One will appreciate that the front walls 134 can prevent a nut or other fastening device from being pulled out of the mounting channel 132. In alternative implementations, the mounting channels 132 can have square, triangular, rectangular or other shapes.

The posts 120 also can include an entry recess 138, which separates the front walls 134 and provides access to the mounting channels 132. Opposing mounting walls 140 can define the entry recesses 138. The entry recess 138 can have a size and shape corresponding to a mounting protrusion of a mounting member as explained in greater detail below. In one or more implementations, the entry recess 138 can have a width in one or more of the following ranges: 0.25" to 0.50"; 0.50" to 1.00"; and 1.00" to 2.00".

In addition to the foregoing, FIG. 2 illustrates that the post 120 can further include clip receivers 142. The clip receivers 142 can comprise structure to which covers 112 (FIG. 1) can attach. One will appreciate in light of the disclosure herein, that clip receivers 142 can have various forms and shapes and can couple to various portions of the post 120, in order to support and/or secure the covers 112. For example, as shown by FIG. 2, in at least one implementation the clip receivers 142 can comprise generally planar walls that extend away from a mounting channel 132 on a first support member 122 toward adjacent support members 122. Thus, the clip receivers 142 can extend generally parallel to one or more of the mounting walls 140 and the support member 122, and generally perpendicular to the front walls 134. In alternative implementations, the clip receivers 142 can comprise a curvilinear or compound shape.

Figure 3:
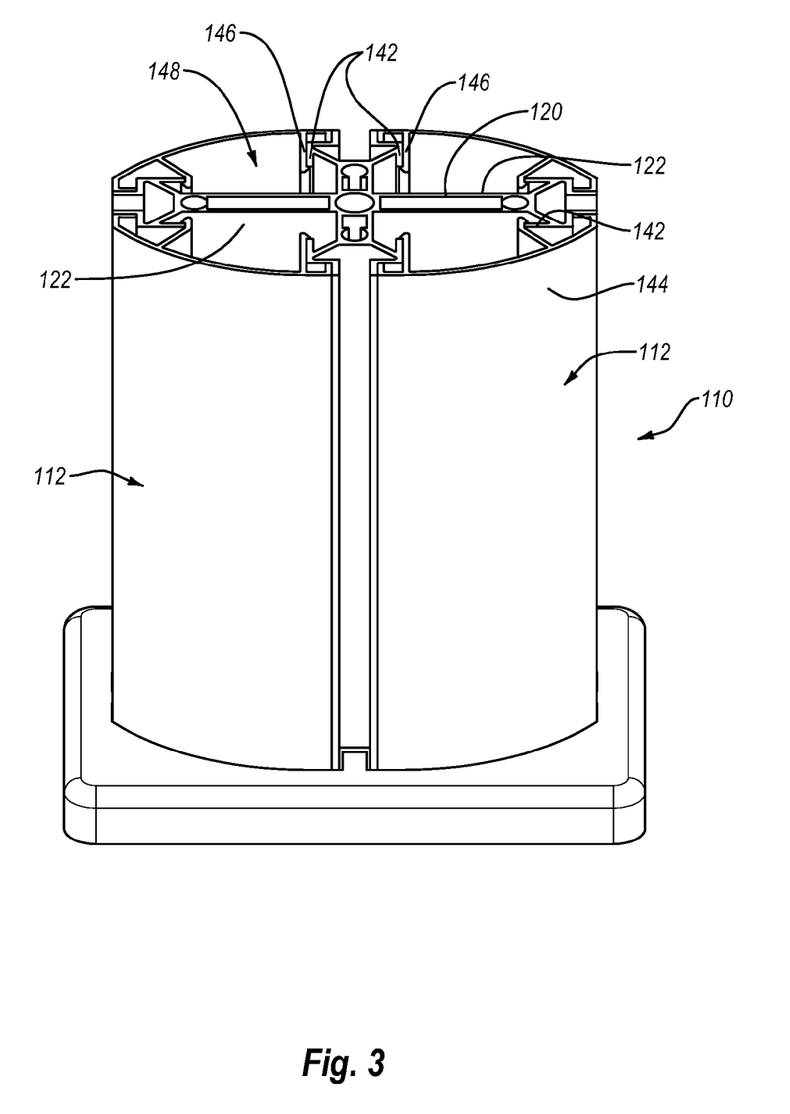
FIG. 3 illustrates a perspective view of a post module assembly in accordance with one implementation of the present invention.

As described above, in at least one implementation, the post module assembly 110 can include covers 112, which can removably attach to the post 120. As shown by FIG. 3, the covers 112 can have an arcuate face 144, and one or more clip members 146. The clip members 146 can slide over or snap into a portion of the post 120. For instance, the clip members 146 can slide over or snap into the clip receivers 142, such as to retain and immobilize the covers 112 with respect to the post 120. In alternative implementations, in addition to clips or alternative to clips, magnets, or Velcro, a fastener (i.e., nails, screws, rivet), or a nonpermanent adhesive can secure the covers 112 to the post 120. For example, a portion of the post 120 and a portion of the cover 112 can be magnetically attracted to each other.

In at least one implementation, a single cover 112 can span between two adjacent support members 122 to conceal the portion of the post 120 between the support members 122. Additionally, covers 112 can have various shapes, thicknesses, and configurations, as further described below. In particular, as shown by FIG. 3, the shape of the covers 112 can define the shape of the post module assembly 110. Thus, the arcuate shaped covers 112 can provide the post module assembly 110 with an oval shape. One will appreciate in light of the disclosure herein that different shaped covers 112 can be used to provide the same post 120 with a different aesthetic (i.e., shape, color, design, etc.).

Once attached to the post 120, the covers 112 can at least partially cover and conceal a portion of the post 120. For example, the covers 112 can have sufficient opacity, such that a viewer cannot see the portion of the post 120 that is covered by the cover 112. Alternatively, sufficiently translucent covers 112 can allow at least some visible light to pass. Thus, the covers 112 can conceal the post 120 to various degrees, depending on particular preferences of the builders and users.

Additionally, the covers 112 can define hollow channels 148 between adjacent support members 122. The hollow channels 148 can house various data and power cables and wiring. The hollow channels 148 also can house various functional complements, such as lights, sensors, transformers, etc. For instance, the installer can secure one or more lights within one or more of the hollow channels 148, which can illuminate one or more of the covers 112, the surrounding general area, and one or more of the panels secured to the post module assembly 110. In one or more implementations, an installer can place a lighting track (e.g., LED lights) in the hollow channels 148 to backlight a panel secured to the post module assembly 110.

The covers 112 can comprise a wide variety of materials. Examples of such materials include but are not limited to polyvinyl chloride or "PVC"; polyacrylate materials such as acrylic, and poly(methylmethacrylate) or "PMMA"; polyester materials such as poly(ethylene-co-cyclohexane 1,4-dimethanol terephthalate), or "PET"; poly(ethylene-co-cyclohexane 1,4-dimethanol terephthalate glycol) or "PETG"; glycol modified polycyclohexylenedimethlene terephthalate; or "PCTG"; as well as polycarbonate materials. Moreover, the covers 112 generally can incorporate any suitable, naturally occurring or synthetic material, including but not limited to wood, glass, metal, plastic, rubber, fabric, or combinations thereof. For instance, the covers 112 can include a wood surface with stainless steel decorative strips or rivets. Similarly, in at least one implementation, the covers 112 can comprise a suitable plastic material and a fabric secured to a surface thereof.

Additionally or alternatively, as described above, in one or more implementations, post module assembly 110 can incorporate multiple covers 112 segmented along the length of the post 120. Thus, the builder or user can choose the segments that can have different materials or material combinations as well as different colors, shapes, designs, and transparency, translucency and opacity properties. For example, the builder can choose covers 112 that match one or more of the color, texture, inclusions, translucency, and overall appearance of the panels secured to the post module assembly 110. In light of this disclosure, other combinations of various segments of the covers 112 will be appreciated by those skilled in the art.

In one or more implementations, the covers 112 can include inserts of various materials, colors, shapes, and textures. For example, the covers 112 can incorporate inserts that can enhance the aesthetic of the covers 112. The manufacturer can incorporate inserts into the covers 112 by fastening, overmolding, or laminating the inserts to the covers 112. The covers 112 also can include metallic or magnetic inserts, such that a magnetic or metallic element can hold on a surface of the covers 112, which incorporates such inserts.

Figure 4:
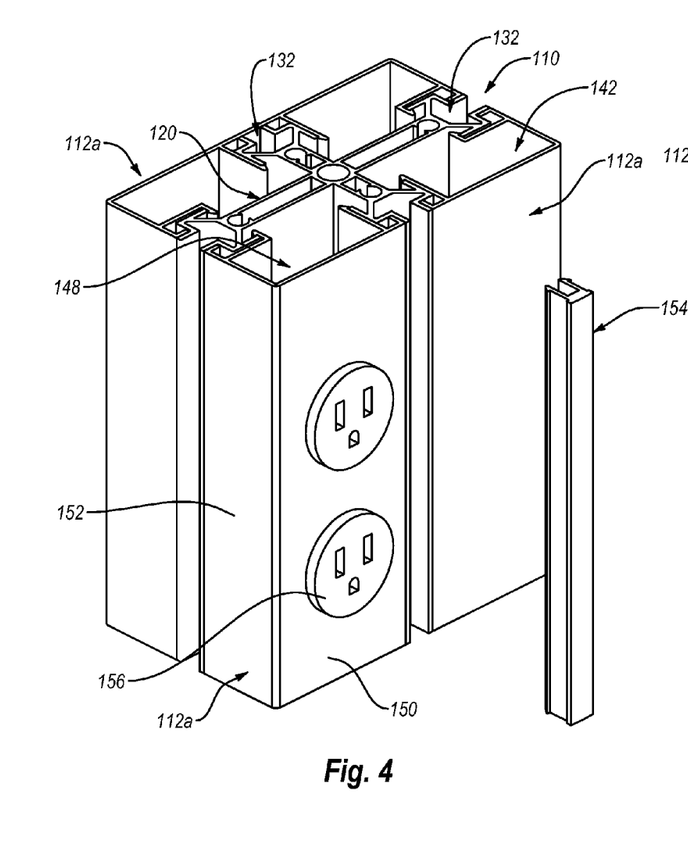
FIG. 4 illustrates a perspective view of another post module assembly in accordance with one implementation of the present invention.

In addition to the above-described variants, the covers 112 can have other shapes, configurations, and functionality. For example, FIG. 4 illustrates corner covers 112a. The corner covers 112a can provide the post 120 with a square or rectangular shape. The corner covers 112a can have multiple surfaces. For example, the corner covers 112a can include a first face 150 and a second face 152.

The covers 112a can extend between adjacent mounting channels 132. Alternatively, as shown by the back cover 112a of FIG. 4, a single cover 112 can span across at least one of the mounting channels 132, such that to conceal a portion of at least one of the mounting channels 132 that is not used for mounting panels. Similarly, the installer can secure a channel insert 154 within the mounting channel 132 and/or recess 138 to conceal the mounting channel 132 or a portion thereof that is not used to mount panels.

The covers 112a also can incorporate various functional devices 156. In particular, the covers 112a can have any of a variety of different functional devices used in residential and/or commercial construction. For example, the covers 112a can incorporate a light switch, such as a toggle light switch, rocker switch, push button switch, dimmer switch, other similar switches, and/or combinations of the same. Additionally or alternatively, the covers 112a can include power outlets, a phone jack, data jack, a network port, a coaxial cable outlet, RCA outlet, HDMI cables, and/or other similar outlets.

Figure 5:
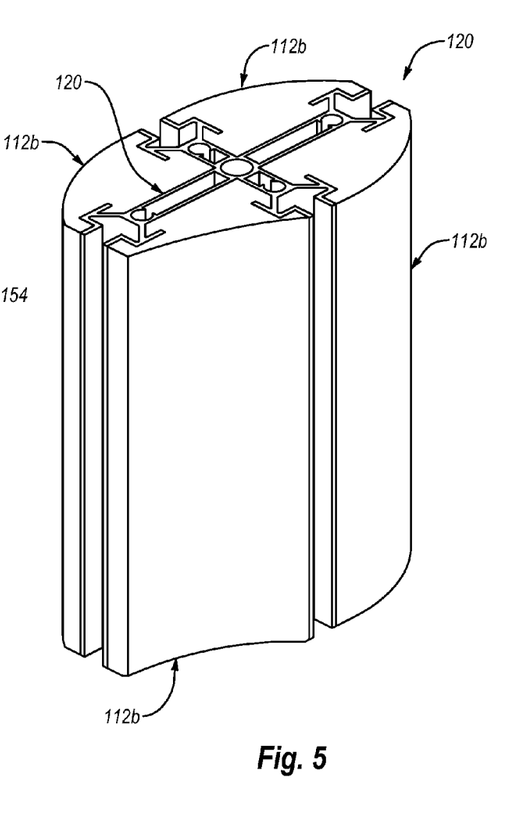
FIG. 5 illustrates a perspective view of yet another post module assembly in accordance with one implementation of the present invention.

The covers 112a also can have various (and varying) wall thicknesses. For example, FIG. 5 illustrates covers 112b that comprise a solid shape. As such, the covers 112b do not form hollow channels 148 with the post 120. Thus, in one or more implementations the covers 112b can comprise wood blocks as shown in FIG. 5. In alternative implementations, the covers 112b can comprise a block of plastic or other material with a veneer attached (e.g., a wood veneer). In addition to appealing aesthetic, such covers can have high impact resistance, which can protect the covers 112b as well as the post 120 from accidental impact. Additionally, such covers 112b also can increase the overall rigidity and strength of the entire system.

One will appreciate in light of the disclosure herein that the covers 112, 112a, 112b can add both functional and aesthetic versatility to a post 120. In particular, an installer can change the function and/or aesthetic of a given post 120 by varying the covers 112, 112a, 112b attached thereto. Thus, if needed an installer can vary the function of a post module assembly 110 (i.e., add functional devices 156 or lighting elements) by switching the covers 112, 112a, 112b without having to disconnect, move, or change the posts 120. Furthermore, an installer can similarly change the aesthetic (i.e., color, shape, design, material) of a given post 120 by varying the covers 112, 112a, 112b attached thereto.

Figure 6A:
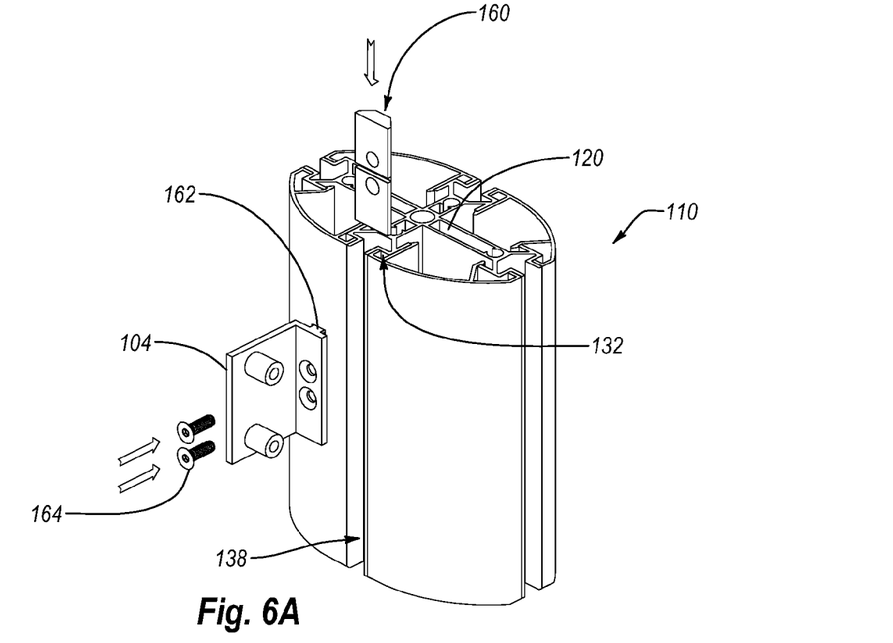
FIGS. 6A and 6B illustrate perspective views of a panel being mounted to post module assemblies with mounting members in accordance with an implementation of the present invention.
Figure 6B:
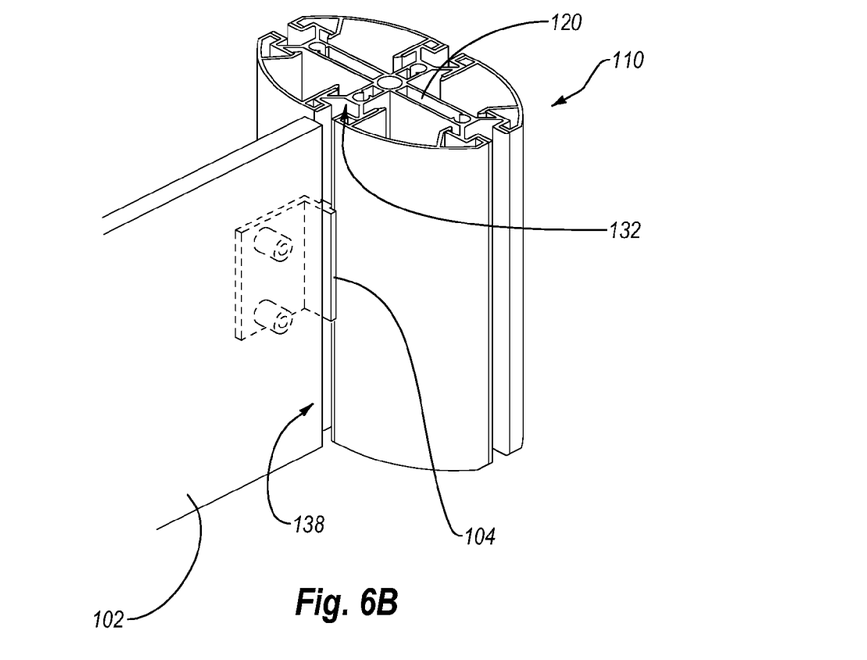

As previously mentioned, to mount panels to a post module assembly 110, the installer can use various mounting members. For instance, as illustrated in FIGS. 6A and 6B, the installer can secure a panel 102 with a mounting member 104. In one or more implementations, the installer can insert one or more t-nuts 160 into mounting channel 132 of the post 120. The installer can then insert a mounting protrusion 162 of the mounting member 104 into the entry recess 138 of the post 120. The installer can then secure the mounting member 104 to the one or more t-nuts 160 using one or more fasteners (such as screws 164) as demonstrated in perspective view of FIG. 6A. The installer can then secure a panel 102 to the mounting member 104.

The perspective view in FIG. 6B illustrates an implementation in which the panel 102 is parallel to the mounting channel 132 to which the panel 102 is secured. In alternative implementations, spider type mounting members can mount the panel 102 in front of the post 120. In particular, spider type mounting members can secure the panel 102 perpendicular to the post 120 so that the panel 102 extends in front of the post 120. In such implementations, lighting elements within the post module assembly 110 can back light the panel 120. In yet further implementations, the mounting members can mount a panel 102 horizontally to a post module assembly 110 so the panel 102 can act as a shelf, table, or bench. In alternative implementations, the installer can insert an edge of the panel 102 directly into a mounting channel 132 of the post 120. The installer can then use a gasket or pins to retain the panel 102 in the mounting channel 132. One will thus appreciate in light of the disclosure herein that the implementations of the present invention can provide a wide range of versatility for mounting panels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A system of mounted panels configured as one or more of doors, partitions, barriers, displays, shelving, tables, and other structures, comprising:
    one or more post module assemblies, each of the post module assemblies of the one or more post module assemblies comprising a post with a plurality of mounting channels, and a plurality of covers secured to the post,
    wherein:
        each of the plurality of mounting channels comprises:
            a receiving channel defined by internal surfaces of one or more walls that partially surround the receiving channel, wherein the receiving channel is sized and configured to receive one or more mounting members, and
            a clip receiver extending from an external surface of one of the one or more walls,
        each cover of the plurality of covers spans between at least two mounting channels of the plurality of mounting channels, each cover of the plurality of covers comprising one or more attachment features at opposing first and second distal ends of the cover, the one or more attachment features selectively and securely connecting the opposing first distal end to the post at a first clip receiver of the first mounting channel and second distal end to the post at a second clip receiver at the second mounting channel;
    one or more base assemblies secured to the one or more post module assemblies and to one or more support surfaces; and
    one or more panels mounted directly in one or more of the mounting channels.

2. The system as recited in claim 1, wherein at least one of the one or more post modules is illuminated by one or more lighting components disposed within one or more channels formed by and between the post and at least one cover of the plurality of covers, such that the at least one cover is backlit by the one or more lighting components.

3. The system as recited in claim 1, further comprising one or more mounting members secured within one or more mounting channels of the plurality of mounting channels, the mounting members securing the one or more panels to the one or more post modules.

4. The system as recited in claim 1, wherein the one or more panels are decorative thermoplastic resin panels.

5. The system as recited in claim 4, wherein the plurality of covers are thermoplastic resin covers.

6. The system as recited in claim 5, wherein the plurality of thermoplastic resin covers are configured to match one or more of a color, texture, and design of at least one of the one or more thermoplastic resin panels.

7. The system as recited in claim 3, wherein at least one mounting member of the one or more mounting members secures at least one panel of the one or more panels to at least one post module of the one or more post modules such that the at least one panel and the at least one post module are oriented in a non-parallel arrangement relative to one another.

8. The system as recited in claim 3, wherein at least one cover of the plurality of covers is formed of a material that is sufficiently translucent to allow some visible light to pass between an interior surface and an exterior surface of the at least one cover.

9. The system as recited in claim 2, wherein the at least one post module is configured to backlight the at least one panel.

10. The system as recited in claim 1, wherein the plurality of mounting channels comprises first, second, and third mounting channels, and wherein at least one individual cover of the plurality of covers extends between the first and third mounting channels and completely spans the second mounting channel so as to cover the second mounting channel.

11. The system as recited in claim 1, wherein at least one of the one or more post module assemblies further comprises at least one channel insert that is insertable within at least one mounting channel of the plurality of mounting channels to conceal only the at least one mounting channel.

12. The system as recited in claim 1, wherein at least one cover of the plurality of covers comprises a functional device.

13. The system as recited in claim 12, wherein the functional device is at least one of a switch, a jack, or an outlet.

14. A system of mounted panels configured as one or more of doors, partitions, barriers, displays, shelving, tables, and other structures, comprising:
 one or more post module assemblies, each of the post module assemblies of the one or more post module assemblies comprising a post with a plurality of mounting channels, and a plurality of covers secured to the post,
  wherein:
   the plurality of mounting channels are sized and configured to receive one or more mounting members,
   a cover extends from a first mounting channel to a second mounting channel, wherein:
    a first distal end of the cover abuts an entry recess of the first mounting channel and an opposing second distal end of the cover abuts an entry recess of the second mounting channel,
    the cover comprises one or more attachment features at the first and second distal ends of the cover,
    the one or more attachment features selectively and securely connecting the opposing first distal end at the first mounting channel and the second distal end at the second mounting channel; and
 one or more base assemblies secured to the one or more post module assemblies and to one or more support surfaces; and
 one or more panels mounted directly in one or more of the mounting channels.

15. The system as recited in claim 14, wherein each of the plurality of mounting channels comprises one or more attachment features to which the attachment features of the covers can be selectively and securely connected.

16. A system of mounted panels configured as one or more of doors, partitions, barriers, displays, shelving, tables, and other structures, comprising:
 one or more post module assemblies, each of the post module assemblies of the one or more post module assemblies comprising a post with a plurality of mounting channels, and a plurality of covers secured to the post,
  wherein:
   the plurality of mounting channels are sized and configured to receive one or more mounting members, and
   each cover of the plurality of covers spans between at least two mounting channels of the plurality of mounting channels, each cover of the plurality of covers comprising one or more attachment features at opposing first and second distal ends of the cover, the one or more attachment features selectively and securely connecting the opposing first and second distal ends to the post at the at least two mounting channels;
 one or more base assemblies secured to the one or more post module assemblies and to one or more support surfaces; and
 one or more panels mounted directly in one or more of the mounting channels.

17. The system as recited in claim 16, wherein each of the plurality of mounting channels comprises one or more attachment features to which the one or more attachment features of the covers can be selectively and securely connected.

18. The system as recited in claim 16, wherein at least one of the one or more post modules is illuminated by one or more lighting components disposed within one or more channels formed by and between the post and at least one cover of the plurality of covers, such that the at least one cover is backlit by the one or more lighting components.

19. The system as recited in claim 16, wherein at least one cover of the plurality of covers comprises one or more inserts.

* * * * *